(12) United States Patent
Liu et al.

(10) Patent No.: US 10,664,219 B2
(45) Date of Patent: May 26, 2020

(54) DISPLAY APPARATUS AND DISPLAY CONTROL METHOD

(71) Applicant: Chipone Technology (Beijing) Co., Ltd., Beijing (CN)

(72) Inventors: Haifeng Liu, Beijing (CN); Yong Wang, Beijing (CN); Yongsheng Tang, Beijing (CN)

(73) Assignee: Chipone Technology (Beijing) Co., Ltd. (CN)

( * ) Notice: Subject to any disclaimer, the term of this patent is extended or adjusted under 35 U.S.C. 154(b) by 192 days.

(21) Appl. No.: 15/799,596

(22) Filed: Oct. 31, 2017

(65) Prior Publication Data

US 2019/0065133 A1 Feb. 28, 2019

(30) Foreign Application Priority Data

Aug. 31, 2017 (CN) .......................... 2017 1 0775433

(51) Int. Cl.
*G06F 3/14* (2006.01)

(52) U.S. Cl.
CPC ..... *G06F 3/1446* (2013.01); *G09G 2300/026* (2013.01); *G09G 2370/04* (2013.01)

(58) Field of Classification Search
CPC .............. G06F 3/1446; G09G 2370/04; G09G 2300/026
See application file for complete search history.

(56) References Cited

U.S. PATENT DOCUMENTS

| | | | | |
|---|---|---|---|---|
| 2008/0100805 A1* | 5/2008 | Majumder | ............ | G03B 21/26 353/30 |
| 2010/0097294 A1* | 4/2010 | Kastrup | ................ | G06F 3/1446 345/1.3 |
| 2010/0188567 A1* | 7/2010 | Ichimura | ................ | H04N 19/00 348/441 |
| 2011/0164065 A1* | 7/2011 | Mate | ..................... | G06F 3/1446 345/676 |
| 2013/0181884 A1* | 7/2013 | Perkins | ................ | H04N 9/3147 345/1.3 |
| 2014/0062975 A1* | 3/2014 | Panvelwala | ........... | G06F 3/1446 345/204 |
| 2014/0160101 A1* | 6/2014 | Chen | ..................... | G06F 3/1446 345/207 |
| 2014/0354827 A1* | 12/2014 | Nakashima | ...... | H04N 21/42202 348/177 |

(Continued)

*Primary Examiner* — Jose R Soto Lopez
(74) *Attorney, Agent, or Firm* — JW Law Group; James M. Wu

(57) ABSTRACT

The present disclosure relates to a display apparatus and a display control method, the display apparatus comprises: a display panel which comprises a plurality of sub display panels arranged in an array, the plurality of sub display panels are connected by a display channel to form a first topology and are also connected by an information channel according to a predetermined second topology; and a detecting device configured to obtain basic information of the display panel and determine the first topology according to the basic information and the second topology. The display apparatus and the display control method can automatically detect the topology of the plurality of sub display panels of the display panel, so that the debugging process on the display panel can be accelerated.

20 Claims, 6 Drawing Sheets

(56) References Cited

U.S. PATENT DOCUMENTS

| | | | |
|---|---|---|---|
| 2015/0178036 A1* | 6/2015 | Kawahara | G06F 3/1446 |
| | | | 348/383 |
| 2015/0213573 A1* | 7/2015 | Mukawa | G02B 27/017 |
| | | | 345/522 |
| 2015/0287390 A1* | 10/2015 | Kakeko | H04L 61/2038 |
| | | | 345/1.1 |
| 2016/0224306 A1* | 8/2016 | Rycyna, III | G09G 3/32 |
| 2016/0259614 A1* | 9/2016 | Liao | H04N 9/3185 |
| 2016/0378421 A1* | 12/2016 | Radhakrishnan | G06F 3/1446 |
| | | | 345/1.3 |
| 2017/0024179 A1* | 1/2017 | Terao | G06F 3/1446 |
| 2018/0129510 A1* | 5/2018 | Zhang | H04L 67/38 |
| 2018/0144712 A1* | 5/2018 | Threlkel | G09G 3/38 |
| 2018/0267758 A1* | 9/2018 | Zhao | G09G 3/20 |
| 2018/0304151 A1* | 10/2018 | Hicks | A63F 13/25 |
| 2019/0026061 A1* | 1/2019 | Wang | G09G 5/14 |

* cited by examiner

DISPLAY APPARATUS AND DISPLAY CONTROL METHOD

CROSS-REFERENCE TO RELATED APPLICATION

This application claims the benefit of Chinese Patent Application No. 201710775433.8, filed on Aug. 31, 2017, which is incorporated herein by reference in its entirety.

BACKGROUND OF THE DISCLOSURE

Field of the Disclosure

The present disclosure relates to the technical field of display control technology, and in particularly, to a display apparatus and a display control method.

Background of the Disclosure

With development of display technologies, people put forward higher and higher requirements on image quality, wherein a most important point is that image resolution is developed to be higher and higher from full high definition (FHD) resolution with 1920*1080 pixels to 4K resolution with 3840*2160 pixels, even to 8K resolution with 7680*4320 pixels. With the increase of the resolution, displaying by applying a single independent display panel becomes more and more difficult. Specifically, higher image resolution generally requires a display panel with larger size, which leads to a lower yield for producing the display panel. Therefore, generally, several sub display panels with lower resolution are spliced and packaged together to form a display panel with higher resolution.

Different connecting forms between the sub display panels will lead to different sequences of display data which is sent to each sub display panel. Therefore, when the apparatus is under debugging, the connecting form (i.e., topology) need to be judged, and then the sequence of the display data is adjusted according to the topology, the adjusted display data is provided to the plurality of sub display panels of the display panel for displaying. Once the topology of the plurality of sub display panels has been adjusted, corresponding reconfiguration should be set. These work will take a lot of time and efforts.

SUMMARY OF THE DISCLOSURE

In view of this, the disclosure provides a display apparatus and display control method, which can automatically detect the topology of the plurality of sub display panels of the display panel, so that the debugging process on the display panel can be accelerated.

According to a first aspect of the present disclosure, there is provided a display apparatus, comprising: a display panel which comprises a plurality of sub display panels arranged in an array, wherein the plurality of sub display panels are connected by a display channel to form a first topology and are also connected by an information channel according to a predetermined second topology; and a detecting device configured to obtain basic information of the display panel and determine the first topology according to the basic information and the second topology.

Preferably, the detecting device comprises an information extracting module and a detecting module, the information extracting module is configured to obtain the basic information of the display panel, and to read, through the information channel, data of a testing image received by each of the plurality of sub display panels, wherein the basic information includes resolution of the display panel and resolution of each of the plurality of sub display panels; the detecting module is configured to generate the testing image according to the basic information of the display panel, provide the testing image to the plurality of sub display panels of the display panel through the display channel, and determine the first topology according to the second topology and the data of the testing image received by each of the plurality of sub display panels and provided by the information extracting module, the testing image carries information corresponding to locations of the plurality of sub display panels in the display panel.

Preferably, the resolution of the display panel is artificially set and the resolution of each of the plurality of sub display panels is extracted from a respective one of the plurality of sub display panels through the information channel.

Preferably, the display apparatus further comprises: a display data sending device configured to sequence display data according to the first topology determined by the detecting device and provide the sequenced display data to the display panel through the display channel; wherein the detecting device further comprises: a switching module configured to connect the detecting module to the display channel of the display panel at detecting phase, and connect the display data sending device to the display channel of the display panel at displaying phase.

Preferably, the detecting module comprises: an image generating unit configured to generate the testing image according to the resolution of the display panel, and divide the testing image into a plurality of sub portions according to the resolution of each of the plurality of sub display panels, each of the plurality of sub portions corresponds to a respective one of the plurality of sub display panels, the plurality of sub portions are sequenced according to a predetermined third topology; a topology calculating unit configured to determine a location of each of the plurality of sub display panels in the array according to the second topology, and adjust the third topology according to a relationship between locations of the sub portions received by the plurality of sub display panels in the testing image and the locations of the plurality of sub display panels in the array to obtain the first topology.

Preferably, the testing image comprises data elements arranged in a matrix having a size corresponding to the resolution of the display panel, the matrix is partitioned into a plurality of submatrices corresponding to the plurality of sub display panels respectively and having a sending order determined according to the third topology, the data elements in each submatrix represent the location of the submatrix in the matrix.

Preferably, the testing image comprises data elements arranged in a matrix having a size corresponding to the resolution of the display panel, each of the data elements in the matrix represents a location of a pixel in the display panel, the matrix is partitioned into a plurality of submatrices corresponding to the plurality of sub display panels respectively and having a sending order determined according to the third topology.

Preferably, the information channel comprises a one-way information sending path and a one-way information returning path.

Preferably, the information channel is a two-way channel.

Preferably, the information channel is a serial channel or a parallel channel.

According to a second aspect of the present disclosure, there is provided a display control method, comprises: obtaining basic information of a display panel which comprises a plurality of sub display panels arranged in an array, wherein the plurality of sub display panels are connected by a display channel to form a first topology and an information channel connects the plurality of sub display panels according to a predetermined second topology; and determining the first topology according to the basic information and the second topology.

Preferably, the basic information includes resolution of the display panel and resolution of each of the plurality of sub display panels, and step of determining the first topology according to the basic information and the second topology comprises: generating a testing image according to the basic information and providing the testing image to the plurality of sub display panels of the display panel through the display channel, wherein the testing image carries information corresponding to locations of the plurality of sub display panels in the display panel; through the information channel, reading data of the testing image received by the plurality of sub display panels; determining the first topology according to the second topology and the data of the testing image received by the plurality of sub display panels.

Preferably, the display control method further comprises: after the first topology is determined, sequencing display data according to the determined first topology and providing the sequenced display data to the display panel through the display channel.

Preferably, the step of generating the testing image according to the basic information comprises: generating the testing image according to the resolution of the display panel and dividing the testing image into a plurality of sub portions according to the resolution of each of the plurality of sub display panels, wherein each of the plurality of sub portion corresponds to a respective one of the sub display panels and the plurality of sub portions are sequenced according to a predetermined third topology; and the step of determining the first topology according to the second topology and the data of the testing image received by the plurality of sub display panels comprises: determining a location of each of the plurality of sub display panels in the array according to the second topology, and adjusting the third topology according to a relationship between locations of the plurality of sub portions received by the plurality of sub display panels in the testing image and the locations of the plurality of sub display panels in the array to obtain the first topology.

Preferably, the resolution of the display panel is artificially set and the resolution of each sub display panel is extracted through the information channel.

Preferably, the testing image comprises data elements arranged in a matrix having a size corresponding to the resolution of the display panel, the matrix is partitioned into a plurality of submatrices corresponding to the resolution of each of the plurality of sub display panels and having a sending order determined according to the third topology, each of the plurality of submatrices corresponds to a respective one of the plurality of sub display panels, the data elements in each of the plurality of submatrices represent the location of the submatrix in the matrix.

Preferably, the testing image comprises data elements arranged in a matrix having a size corresponding to the resolution of the display panel, each of the data elements in the matrix represents a location of the data element in the matrix, the matrix is partitioned into a plurality of submatrices corresponding to the resolution of each of the plurality of sub display panels and having a sending order determined according to the third topology, each of the plurality of submatrices corresponds to a respective one of the plurality of sub display panels.

Preferably, the step of through the information channel, reading the data of the testing image received by the plurality of sub display panels comprises: through the information channel, reading one of the data elements at a designate location in the submatrix received by each of the plurality of sub display panels.

Preferably, step of adjusting the third topology according to the relationship between the locations of the plurality of sub portions received by the plurality of sub display panels in the testing image and the locations of the plurality of sub display panels in the array comprises: for each of the plurality of sub display panels, determining the location of the submatrix received by the sub display panel in the matrix according to the data element at the designate location in the submatrix received by the sub display panel, and if the location of the submatrix received by the sub display panel is not the same with the location of the sub display panel in the array, then in the third topology, replacing the submatrix received by the sub display panel with the submatrix corresponding to the location of the sub display panel in the array.

BRIEF DESCRIPTION OF THE DRAWINGS

In order to more clearly illustrate technical solutions in the embodiments of the disclosure, figures of the embodiments are briefly described as follow, it is apparent that the following description having reference to the figures are not limited to any particular embodiment disclosed.

DETAILED DESCRIPTION OF THE DISCLOSURE

To make the objects, features and advantages of the embodiments of the present disclosure more clear, the technical solutions in the embodiments of the present disclosure will be described clearly and completely with reference to the figures. It is apparent that the described embodiments are only some, but not all of the embodiments of the present disclosure. All of other embodiments, which are obtained by one skilled in the art from the embodiments described hereinbelow without the need for creative work, will fall within the scope of the present disclosure.

Figure 1A:
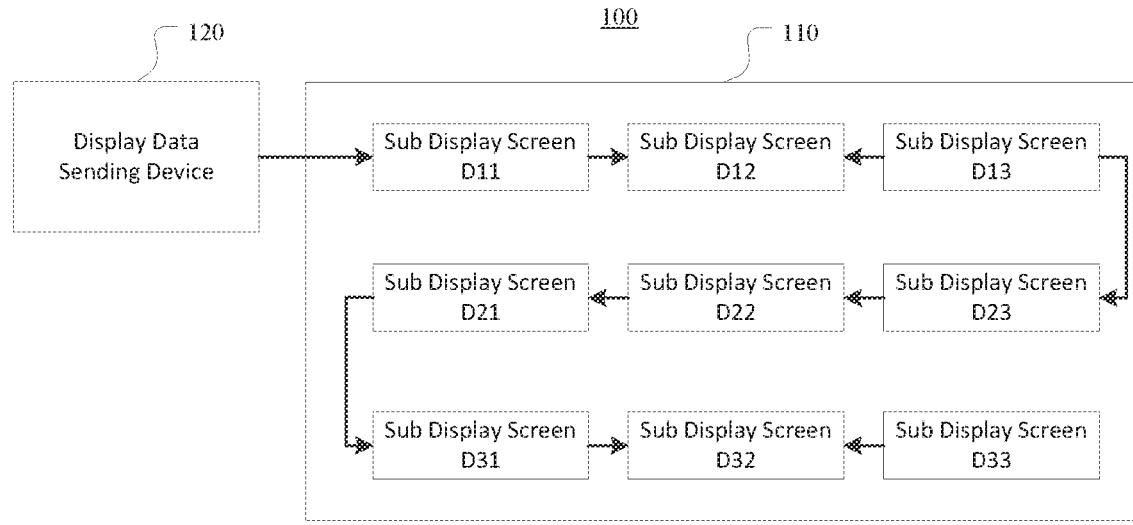
FIGS. 1A and 1B respectively show diagrams of display apparatuses with different display panel topologies.
Figure 1B:
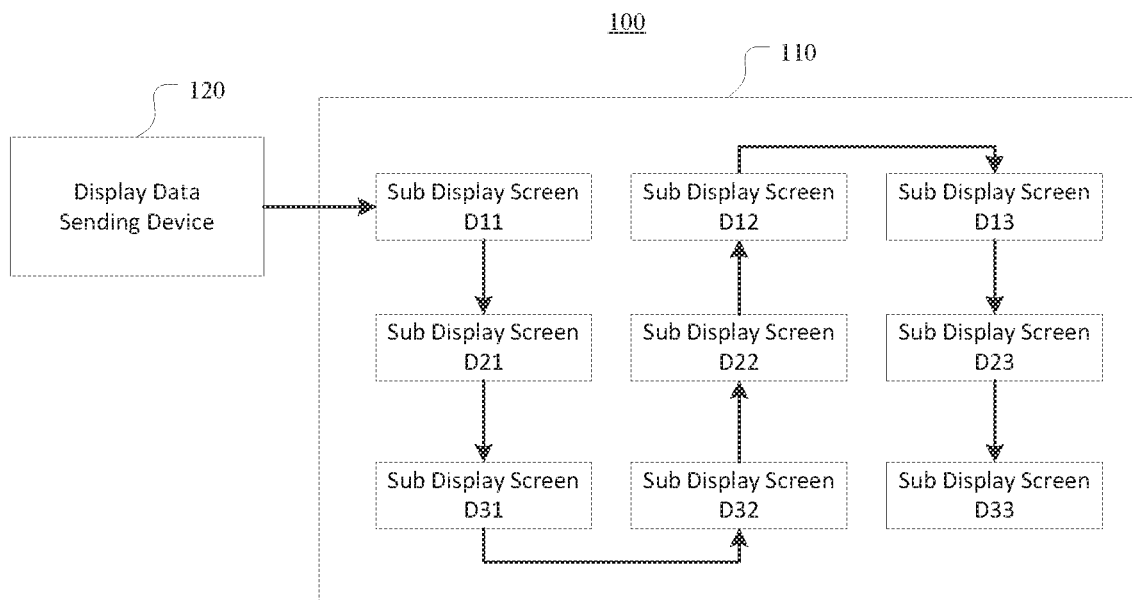

FIGS. 1A and 1B respectively show diagrams of display apparatuses with different display panel topologies. As shown in FIGS. 1A and 1B, display apparatus 100 comprises a display panel 110 and a display data sending device 120, the display panel 110 comprises 9 sub display panels D11, D12, D13, D21, D22, D23, D31, D32 and D33 (which are collectively referred to as sub display panels D) arranged in a 3 by 3 array, the sub display panels D are connected by a display channel (indicated by arrow lines shown in FIGS. 1A and 1B).

Referring to FIG. 1A, the plurality of sub display panels D are cascaded in row direction, that is, in a sequential order of D11, D12, D13, D23, D22, D21, D31, D32 and D33. The display data sending device 120 partitions display data, such as image data and video data, according to each sub display panel D, and sequences the partitioned display data following the same sequential order for use by the corresponding sub display panels D to display.

Referring to FIG. 1B, the plurality of sub display panels D are cascaded in column direction, that is, in a sequential order of D11, D21, D31, D32, D22, D12, D13, D23 and D33. The display data sending device 120 partitions the display data according to each sub display panel D, and sequences the partitioned display data following the same sequential order for use by the corresponding sub display panels D to display.

It can be known that, although image regions displayed by the sub display panels D at a same location respectively in FIGS. 1A and 1B are same with each other, the display data provided by the display data sending devices 110 in FIGS. 1A and 1B are arranged in different sequences due to different connecting forms of the sub display panels D. With the increase of the resolution of the display panel, more sub display panels are needed and the connecting form (i.e., topology) among the sub display panels become more complex. For example, a 6 by 9 sub display panel array or a larger one may be required, the topology may also be extended to a mixed structure with cascaded connection and parallel connection or other structures, which requires considerable time and efforts on making the display data sending device provide the display data which can be matched with the topology of the display panel when the display apparatus is under installation and debugging.

Figure 2:
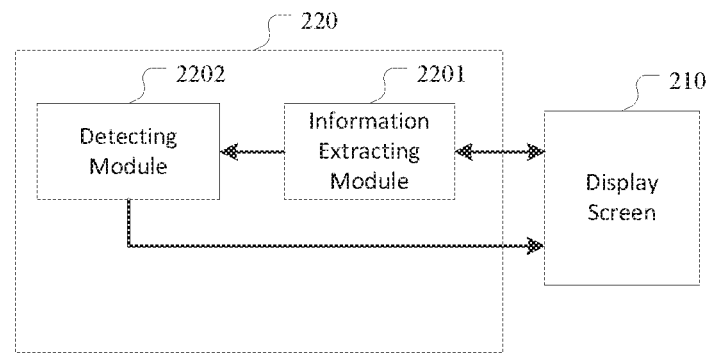
FIG. 2 shows a structural block diagram of a display apparatus according to an embodiment of the present disclosure.

FIG. 2 shows a structural block diagram of a display apparatus according to an embodiment of the present disclosure. As shown in FIG. 2, the display apparatus 200 comprises a display panel 210 and a detecting device 220. The display panel 210 may comprise a plurality of sub display panels arranged in an array. In the embodiment, the plurality of sub display panels can be the same, for example, they may be configured with a same structure, same configurations, or may be used in same applications, etc. The embodiments of the present disclosure are certainly not limited to the above description, the plurality of sub display panels may be different with each other or at least partially different, for example, the sub display panels with different structures, configurations and so on, may be chosen as needed. When the display apparatus is in use, the locations of the sub display panels at different positions can be discretionary adjusted, and normal display can still be implemented.

Figure 3A:
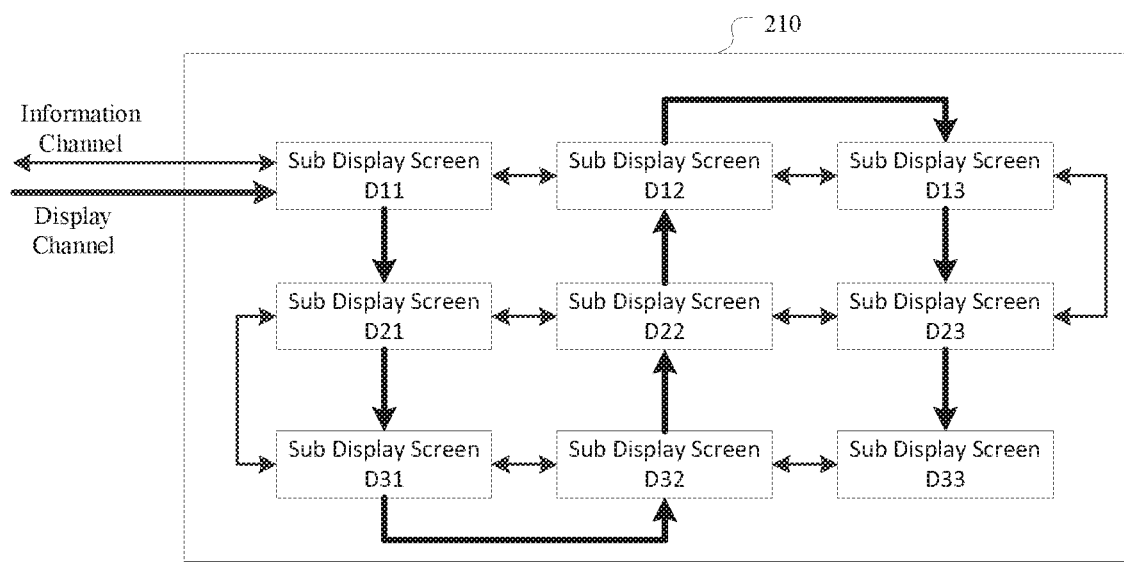
FIG. 3A shows a block diagram of an example structure of the display panel 210 shown in FIG. 2.

FIG. 3A shows a block diagram of an example structure of the display panel 210 shown in FIG. 2. As shown in FIG. 3A, the display panel 210 comprises 9 sub display panels D11, D12, D13, D21, D22, D23, D31, D32 and D33 (which are collectively referred to as sub display panels D) arranged in a 3 by 3 array. The plurality of sub display panels D are connected by a display channel (indicated by thick arrow lines shown in FIG. 3A) to form a first topology, and are connected by an information channel (indicated by thin arrow lines shown in FIG. 3A) to form a second topology. The display channel is configured to transfer the display data, such as image data and video data, to the plurality of sub display panels D, the information channel is configured to provide information to the plurality of sub display panels D and receive information from the plurality of sub display panels D. The display channel can connect the sub display panels in arbitrary ways during splicing, while the information channel connects the sub display panels in a determined way. The general reason for this is because connections of the display channel is normally in high speed and complex, while the information channel is in low speed and simple. In other words, the first topology is generally unknown or partially known, while the second topology is predetermined or known, so that the first topology can be figured out according to the known second topology and the information obtained from the information channel. In the embodiment shown in FIG. 3A, the first topology is cascaded in column direction, that is, the sub display panels D are connected in a sequential order of D11, D21, D31, D32, D22, D12, D13, D23 and D33 through the display channel; the second topology is cascaded in row direction, that is, the sub display panels D are connected in a sequential order of D11, D12, D13, D23, D22, D21, D31, D32 and D33. However, one skilled in the art knows that, the first topology and the second topology are not limited thereto, and can be provided in any possible forms as needed, for example, in parallel connections, in a mixed form of parallel connections and cascaded connections or in other topologies. In the embodiment shown in FIG. 3A, the information channel is a two-way channel, the sub display panels D perform two-way information transmission in the sequential order of the sub display panels D11, D12, D13, D23, D22, D21, D31, D32 and D33. For example, if it is required to read information from the plurality of sub display panels D, a set of reading instructions can be sent to a first-order sub display panel D11, the first-order sub display panel D11 transfers the set of the reading instructions to a second-order sub display panel D12, the second-order sub display panel D12 transfers the set of the reading instructions to a third-order sub display panel D13, and so forth, and finally the set of the reading instructions is transferred to a last-order sub display panel D33. During this process, when one of the sub display panels (for example, the sub display panel D23) receives its corresponding reading instruction, it can return the information, which is needed to be returned, order by order. For example, the sub display panel D23 returns the information, which is needed to be returned, through the sub display panel D13, D12 and D11 sequentially.

Figure 3B:
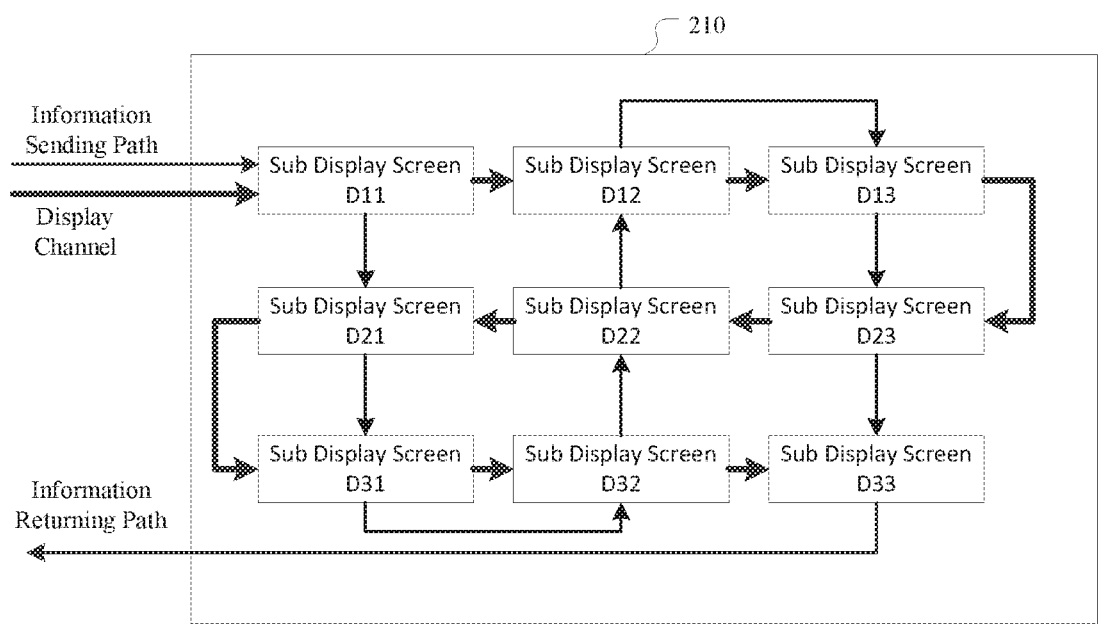
FIG. 3B shows a block diagram of an example structure of the display panel 210 shown in FIG. 2.

FIG. 3B shows a block diagram of an example structure of the display panel 210 shown in FIG. 2. Similarly to FIG. 3A, as shown in FIG. 3B, the display panel 210 comprises a plurality of sub display panels D11, D12, D13, D21, D22, D23, D31, D32 and D33 (which are collectively referred to as sub display panels D) arranged in an array. The plurality of sub display panels D are connected by a display channel (indicated by thick arrow lines shown in FIG. 3B) to form a first topology, and are connected by an information channel (indicated by thin arrow lines shown in FIG. 3B) to form a second topology. The display channel is configured to transfer display data, such as image data and video data, to the plurality of sub display panels D, the information channel is configured to provide information to the plurality of sub display panels D and receive information from the plurality of sub display panels D. The first topology is generally unknown or partially known, while the second topology is predetermined or known, so that the first topology can be figured out according to the known second topology and the information obtained from the information channel. Unlike the embodiment shown in FIG. 3A, in the embodiment referring to FIG. 3B, the first topology is cascaded in row direction, that is, the sub display panels D are connected in a sequential order of D11, D12, D13, D23, D22, D21, D31, D32 and D33 through the display channel; the second topology is cascaded in column direction, that is, the sub display panels D are connected in a sequential order of D11, D21, D31, D32, D22, D12, D13, D23 and D33 through the information channel. However, one skilled in the art knows that, the first topology and the second topology are not limited thereto, and can be provided in any possible forms as needed, for example, in parallel connections, in a mixed form of parallel connections and cascaded connections or in other topologies. Besides, unlike the embodiment shown in FIG. 3A, in the embodiment referring to FIG. 3B, the information channel is a one-way channel, comprising an information sending path and an information returning path. The sub display panels D perform one-way information transmission in the sequential order of the sub display panels D11, D21, D31, D32, D22, D12, D13, D23 and D33 through the information sending path, a last-order sub display panel D33 returns information through the information returning path. For example, if it is required to read information from the plurality of sub display panels D, a set of reading instructions can be sent to a first-order sub display panel D11, the first-order sub display panel D11 transfers the set of the reading instructions to a second-order sub display panel D21, the second-order sub display panel D21 transfers the set of the reading instructions to a third-order sub display panel D31, and so forth, and finally the set of the reading instructions is transferred to the last-order sub display panel D33. During this process, when one of the sub display panels (for example, the sub display panel D22) receives its corresponding reading instruction, it can replace the corresponding reading instruction with the information which is needed to be returned, for example, the reading instruction corresponding to the sub display panel D22 is replaced with the information, which is needed to be returned by the sub display panel D22 and will then be continuously transferred to the sub display panel D12 at the next order. By this kind of one-way transmission and replacement, the last-order sub display panel D33 will receive all the information needed to be returned, and return all the information needed to be returned through the information returning path. By the one-way transmission achieved by the information sending path and the information returning path being independent with each other, the design of each sub display panel can be simplified.

Figure 3C:
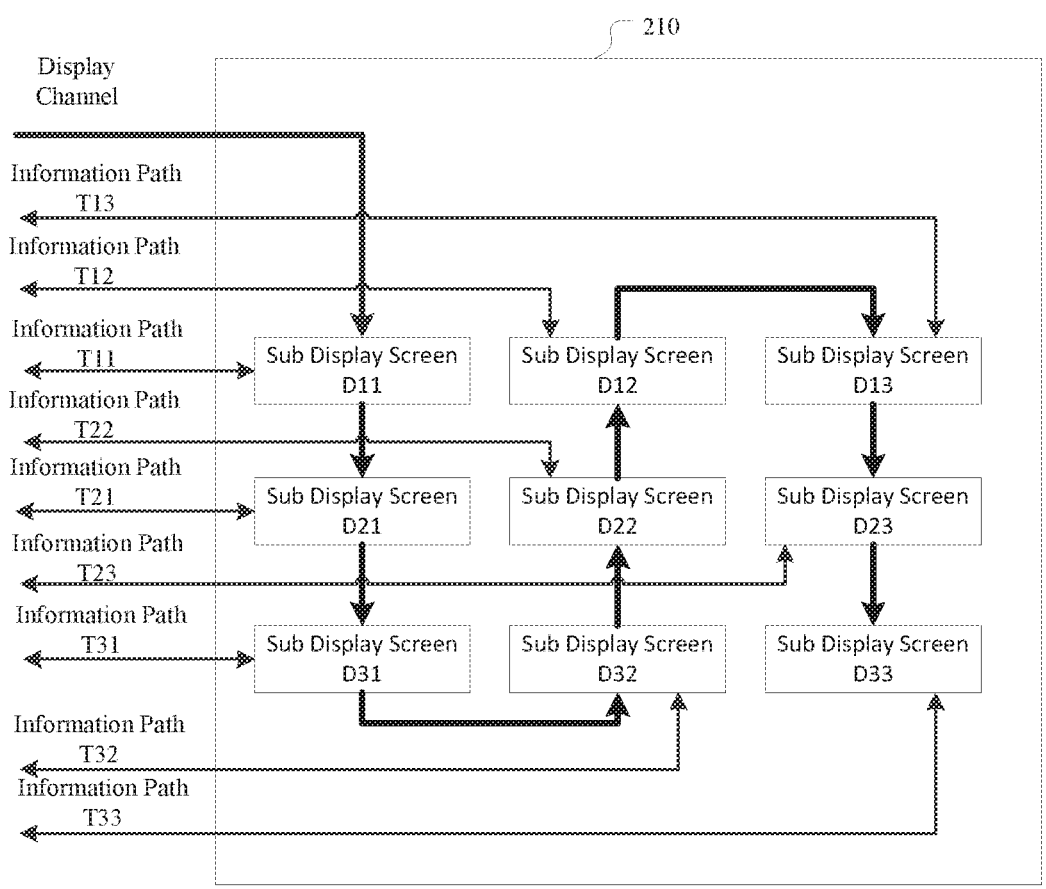
FIG. 3C shows a block diagram of an example structure of the display panel 210 shown in FIG. 2.

FIG. 3C shows a block diagram of an example structure of the display panel 210 shown in FIG. 2. Similarly to FIGS. 3A and 3B, as shown in FIG. 3C, the display panel 210 comprises a plurality of sub display panels D11, D12, D13, D21, D22, D23, D31, D32 and D33 (which are collectively referred to as sub display panels D) arranged in an array. The plurality of sub display panels D are connected by a display channel (indicated by thick arrow lines shown in FIG. 3C) to form a first topology, and are connected by an information channel (indicated by thin arrow lines shown in FIG. 3C) to form a second topology. The display channel is configured to transfer display data, such as image data and video data, to the plurality of sub display panels D, the information channel is configured to provide information to the plurality of sub display panels D and receive information from the plurality of sub display panels D. The first topology is generally unknown or partially known, while the second topology is predetermined or known, so that the first topology can be figured out according to the known second topology and the information obtained from the information channel. Similarly to the embodiment shown in FIG. 3A, as shown in FIG. 3C, the first topology is cascaded in column direction, that is, the sub display panels D are connected in a sequential order of D11, D21, D31, D32, D22, D12, D13, D23 and D33 through the display channel. However, unlike the serial information channel shown in FIGS. 3A and 3B, as shown in FIG. 3C, the information channel is a parallel information channel, that is, each sub display panel D communicates with external environment through a respective information path. In the embodiment shown in FIG. 3C, the sub display panels D11, D12, D13, D21, D22, D23, D31, D32 and D33 respectively connect with information paths T11, T12, T13, T21, T22, T23, T31, T32 and T33 (which are collectively referred to as information paths T hereinafter). In the embodiment shown in FIG. 3C, each information path T is a two-way path, through which each sub display panel D can receive information from the external environment and send information to the external environment.

Although the 3 by 3 array is used as an example in FIGS. 3A, 3B and 3C for description, one skilled in the art should clearly know that, the structure of the display panel according to the embodiments of the disclosure is not limited thereto, quantity and array structure of the sub display panels can be set arbitrarily as needed. The structures of the display channel and the information channel provided above are just described as examples, the embodiments of the disclosure are not limited thereto, the quantity and the arrangement of the display channels and the information channels can be set arbitrarily as needed, for example, can be set to a mixed form of parallel connections and cascaded connections or other forms. Although the display channels and the information channels are shown to be independent with each other, the embodiments of the disclosure are not limited thereto. Furthermore, in the embodiments described above, although the plurality of sub display panels D can be same with each other, for example, the plurality of sub display panels D may be with a same resolution, or even a same structure or configuration, however, the embodiments of the disclosure are not limited thereto. In some embodiments, the plurality of sub display panels may be different, for example, the plurality of sub display panels are configured with different resolutions, different structures, different configurations and/or are used in different applications, etc. Furthermore, referring to FIGS. 3A, 3B and 3C, the second topology of the information channel is different from the first topology of the display channel, however, the embodiments of the present disclosure are not limited thereto. The second topology can be set independently from the first topology, and can be the same with the first topology or be different from the first topology. Certainly, other optimizations for making the second topology similar to the first topology are not excluded, so that subsequent calculation can be simplified.

Referring back to FIG. 2, the detecting device 220 is configured to obtain basic information of the display panel 210 and determine the first topology according to the basic information and the second topology. As shown in FIG. 2, the detecting device 220 may comprises an information extracting module 2201 and a detecting module 2202.

The information extracting module 2201 is configured to obtain the basic information of the display panel, and through the information channel, read data of a testing image respectively received by each of the plurality of sub display panels D. The basic information includes resolution of the display panel 210 and resolution of each of the plurality of sub display panels D. The quantities of the sub display panels D in horizontal direction and in vertical direction of the display panel 210 can both be calculated according to the basic information. It should be noted that, the basic information can be obtained in various ways, for example, it can be obtained by reading from the display panel 210 and/or the plurality of sub display panels D through the information channel, or be directly obtained from users' configuration. In the embodiment, each sub display panel D can store its resolution, which can be read by the information extracting module 2201 through the information channel from each sub display panel D; while the resolution of the entire display panel 210 can be artificially set, for example, it can be directly set by users according to application needs, wherein the users cover anyone who may debug the display panel 210, including designers, maintenance men, persons responsible for installation and debugging, etc. For example, under the condition that all the employed sub display panels D are completely the same, the display panel 210 can be made in any size by splicing as needed, and the resolution of the entire display panel 210 can be quite simple and accurate by artificial setting.

The detecting module 2202 is configured to generate the testing image according to the basic information from the information extracting module 2201, provide the testing image to the plurality of sub display panels D of the display panel 210 through the display channel, and determine the first topology according to the second topology and the data of the testing image which is respectively received by the plurality of sub display panels D and provided by the information extracting module 2201, wherein the testing image carries information corresponding to pixel locations of the display panel 210.

Figure 4A:
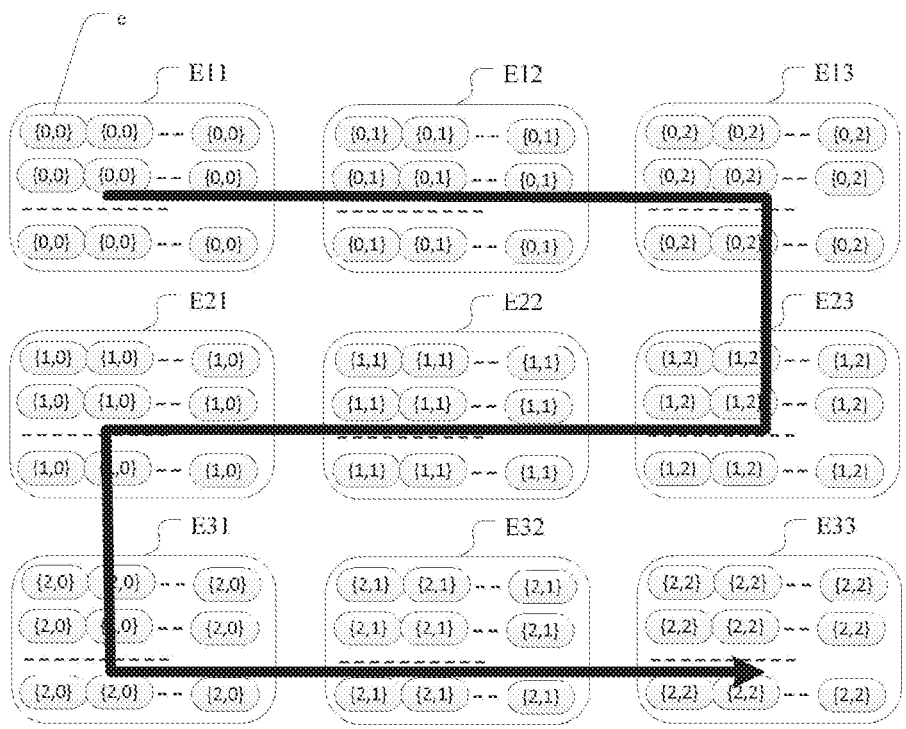
FIG. 4A shows a diagram of a testing image according to an embodiment of the present disclosure.

FIG. 4A shows a diagram of the testing image according to an embodiment of the present disclosure. As shown in FIG. 4A, the testing image is an m by n matrix, m represents row number of the matrix and n represents column number of the matrix, m and n are integers greater than 1, the specific values are determined according to the resolution of the display panel 210. For example, if the resolution of the display panel 210 is 3840*2160, then m and n can be 3840 and 2160, respectively, that is, each data element e in the matrix corresponds to a pixel in the display panel 210. Certainly, the values of m and n can also be obtained by scaling the resolution of the display panel 210 by a same factor. The testing image is partitioned into a plurality of submatrices according to the resolution of the display panel 210 and the resolution of each of the plurality of sub display panels D, each submatrix corresponds to one sub display panel D. For example, for the display panel 210 with 3840*2160-pixel resolution, if the resolution of each of the 9 sub display panels forming the 3 by 3 array is the same and is all 1280*720, then the 3840*2160-pixel testing image can be partitioned into 9 submatrices E11, E12, E13, E21, E22, E23, E31, E32 and E33 (which are collectively referred to as submatrices E) which form a 3 by 3 matrix and correspond to the sub display panels D11, D12, D13, D21, D22, D23, D31, D32 and D33, respectively. The 9 submatrices E are sequenced according to a predetermined third topology, for example, the submatrices E are arranged in a sequential order of E11, E12, E13, E23, E22, E21, E31, E32 and E33 (indicated by arrow lines shown in FIG. 4A). Data elements of each submatrix E represents its location in the entire matrix. For example, the data elements of the submatrix E11 are all {0, 0}, representing that the submatrix E11 locates at the first row and the first column of the entire matrix; the data elements of the submatrix E12 are all {0, 1}, representing that the submatrix E12 locates at the first row and the second column of the entire matrix; the data elements of the submatrix E13 are all {0, 2}, representing that the submatrix E13 locates at the first row and the third column of the entire matrix, and so forth.

Figure 4B:
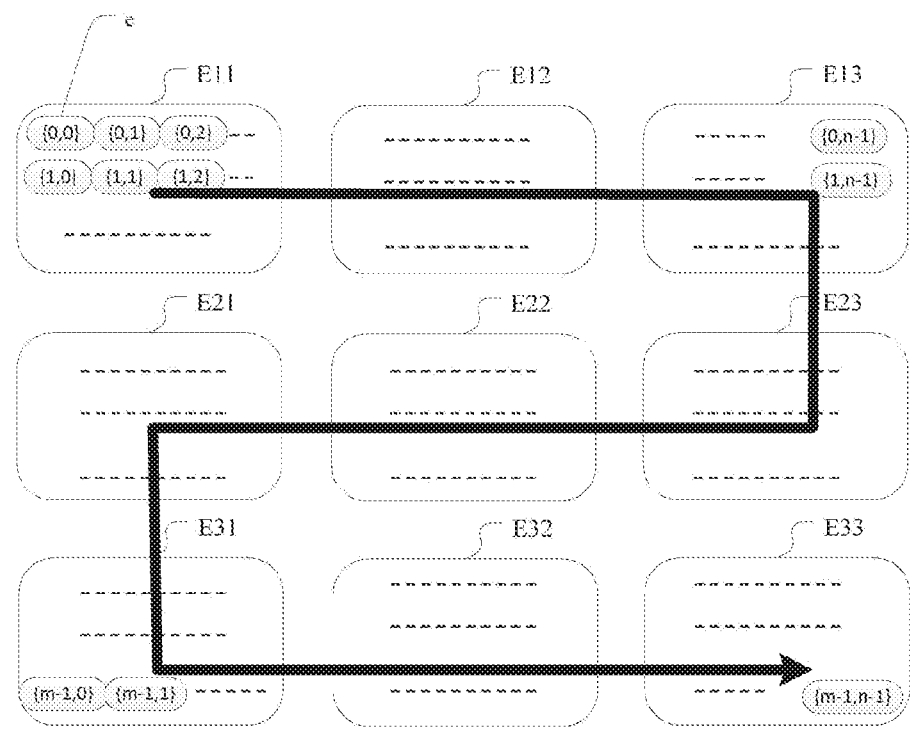
FIG. 4B shows a diagram of a testing image according to an embodiment of the present disclosure.

FIG. 4B shows a diagram of the data of the testing image according to an embodiment of the present disclosure. Similarly to the embodiment shown in FIG. 4A, as shown in FIG. 4B, the data of the testing image forms an m by n matrix, m and n are determined by the resolution of the display panel 210. For example, if the resolution of the display panel 210 is 3840*2160, then m and n can be 3840 and 2160, respectively, that is, each data element e in the matrix corresponds to a pixel in the display panel 210. Certainly, the values of m and n can also be obtained by scaling the resolution of the display panel 210 by a same factor. The data of the testing image is partitioned into a plurality of submatrices according to the resolution of the display panel 210 and the resolution of each of the plurality of sub display panels D, each submatrix corresponds to one sub display panel D, in the embodiment shown in FIG. 4B, the resolution of each sub display panel is 1280*720. For example, for the display panel 210 with 3840*2160-pixel resolution, if the resolution of each of the 9 sub display panels forming the 3 by 3 array is the same and is all 1280*720, then the 3840*2160-pixel testing image can be partitioned into 9 submatrices E11, E12, E13, E21, E22, E23, E31, E32 and E33 (which are collectively referred to as submatrices E) which form a 3 by 3 matrix and correspond to the sub display panels D11, D12, D13, D21, D22, D23, D31, D32 and D33, respectively. The 9 submatrices E are sequenced according to a predetermined third topology, for example, the submatrices E are arranged in a sequential order of E11, E12, E13, E23, E22, E21, E31, E32 and E33 (indicated by arrow lines shown in FIG. 4B). Unlike the embodiment shown in FIG. 4A, as shown in FIG. 4B, each data element in the matrix represents a location of one pixel in the display panel, for example, the data element at the first row and the first column of the matrix is {0, 0}, corresponding to a location of a pixel at the first row and the first column of the display panel 210; the data element at the first row and the second column of the matrix is {0, 1}, corresponding to a location of a pixel at the first row and the second column of the display panel 210, and so forth.

Although the 3 by 3 matrix is used as an example in FIGS. 4A and 4B for description, one skilled in the art should clearly know that, the embodiments of the disclosure are not limited thereto, the testing image is partitioned differently according to different ratios between the resolution of the display panel 210 and the resolution of each of the plurality of sub display panels D. For simplification, a condition that the resolution of each of the sub display panels D is the same is described above as an example, however, one skilled in the art should clearly know that the resolution of each of the plurality of sub display panels can be set arbitrarily as needed, that is, the resolution of each of the plurality of sub display panels can be the same or be different, or the resolutions of part of the plurality of sub display panels can be the same or be different. Furthermore, in the embodiments shown in FIGS. 4A and 4B, the third topology is in cascaded connection in row direction (indicated by the arrow lines shown in FIGS. 4A and 4B), however, one skilled in the art should clearly know that, the embodiments of the disclosure are not limited thereto. The third topology can be configured to any form as needed, for example, it can be configured in cascaded connection in column direction, in parallel connection or in a mixed form of parallel connections and cascaded connections. The third topology can be set independently from the first topology and the second topology, the three topologies may be different from each other or be the same or similar with each other, as long as the first topology can be figured out under the condition that the second topology and the third topology are already known.

Figure 5:
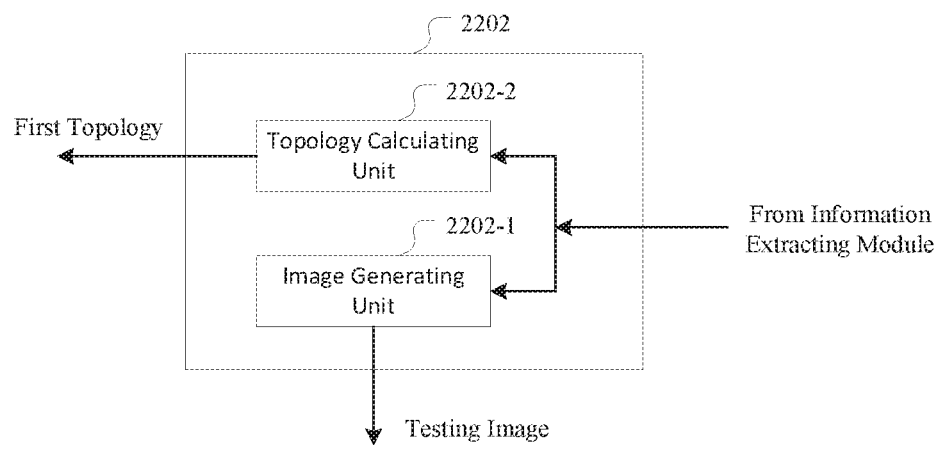
FIG. 5 shows a structural diagram of a detecting module according to an embodiment of the present disclosure.

FIG. 5 shows an example diagram of the detecting module 2202 shown in FIG. 2. As shown in FIG. 5, the detecting module 2202 may comprises an image generating unit 2202-1 and a topology calculating unit 2202-2. The image generating unit 2202-1 is configured to generate the testing image, such as the testing image shown in FIG. 4A and FIG. 4B, according to the resolution of the display panel 210 and the resolution of each of the plurality of sub display panels D. The topology calculating unit 2202-2 is configured to determine the locations of the plurality of sub display panels in the array according to the second topology, and adjust the third topology according to a relationship between the data of the testing image received by the plurality of sub display panels D and the locations of the plurality of sub display panels D in the array to obtain the first topology.

When the first topology is being detected, the information extracting module 2201 can extract the basic information of the display panel 210 through the information channel, the basic information is, for example, the resolution of the display panel 210, the resolution of each of the plurality of sub display panels, etc. The detecting module 2202 generates the testing image according to the basic information provided by the information extracting module 2201, and transfers the testing image to the plurality of sub display panels D of the display panel 210 through the display channel. The testing image carries information corresponding to locations of the pixels on the display panel 210, for example, the testing image can be partitioned into a plurality of sub portions which are arranged in an order according to the predetermined third topology, each portion corresponds to a corresponding sub display panel D. The plurality of sub portions are respectively received by the corresponding sub display panels D following the same order. Through the information channel, the information extracting module 2201 reads the data of the testing image received by each of the plurality of sub display panels D, and provides the data of the testing image to the detecting module 2202. The detecting module 2202 determines the first topology according to the connecting form of the information channel (i.e., the second topology) and the data of the testing image received by each of the plurality of sub display panels D.

The topology of the display panel shown in FIG. 3A and the testing image shown in FIG. 4A are used as examples to describe the determination on the first topology as follow.

The testing image shown in FIG. 4A is provided to the sub display panel D11 after being generated. According to the connecting form (i.e., the first topology) of the display channel shown in FIG. 3A, the sub display panels D in a sequential order of D11, D21, D31, D32, D22, D12, D13, D23 and D33 receive the corresponding submatrices E of the data of the testing image; while, according to the sequencing form (i.e., the third topology), the corresponding submatrices E are arranged in a sequential order of El 1, E12, E13, E23, E22, E21, E31, E32 and E33, which means, the sub display panels arranged in the sequential order of D11, D21, D31, D32, D22, D12, D13, D23 and D33 respectively receive the submatrices of the data of the testing image in the sequential order of E11, E12, E13, E23, E22, E21, E31, E32 and E33.

On one hand, because the information channel is already known, that is, when a submatrix E of the data of the testing image received by one of the plurality of sub display panels D is read through the information channel, the corresponding sub display panel D providing that submatrix E can be known, that is, when a submatrix E of the data of the testing image is received, the location of the corresponding sub display panel D in the entire display panel 210 can be known. For example, the connecting form of the information channel is determined, the information transferring manner of the information channel is determined (the information transferring manner of the information channel is, for example, determined during when the system is under design, and for example, designed to return information following connection order, that is, a sub display panel at a first order in the connecting form returns information firstly, and then a sub display panel at a second order, and so forth), so that the location of each sub display panel D in the display panel 210 can be figured out. The condition shown in FIG. 3A is taken as an example here, it can be determined that a first group of information, a second group of information, a third group of information, . . . , a ninth group of information sequentially read through the information channel are respectively provided by the sub display panels D11, D21, D31, D32, D22, D12, D13, D23 and D33. Under the condition shown in FIG. 3B, it can be determined that a first group of information, a second group of information, a third group of information, . . . , a ninth group of information sequentially read through the information channel are respectively provided by the sub display panels D11, D12, D13, D23, D22, D21, D31, D32 and D33. Under the condition shown in FIG. 3C, the information path for each sub display panel is independent, so that it can be determined which one of the sub display panels is corresponding to the information provided by each information path, for example, the information read from the information path T11 is provided by the sub display panel D11, and the information read from the information channel T12 is provided by the sub display panel D12, and so forth.

On the other hand, the data elements in each submatrix E can represent the location of the corresponding sub portion in the entire testing image, so that when a sub portion provided by a sub display panel is received, the location of that sub portion in the entire testing image can be figured out as well. For example, the data element at a designate location (for example, at the first row and the first column) in each submatrix E is read. For the testing image referring to FIG. 4A, if the data element is {0, 0}, then it is indicated that the corresponding submatrix is E11 which is located at the first row and the first column; if the data element is {2, 1}, then it is indicated that the corresponding submatrix is E32 which is located at the third row and the second column, and so forth. The testing image referring to FIG. 4B is equally suitable, for example, under a condition that the 3840*2160 matrix mentioned above is partitioned into 9 submatrices forming a 3 by 3 array, if the data element is {0, 0}, then it is indicated that the corresponding submatrix is E11 which is located at the first row and the first column; if the data element is {0, 1280}, then it is indicated that the corresponding submatrix is E12 which is located at the first row and the second column, and so forth.

By synthesizing the two aspects mentioned above, the detecting module 2202 can obtain a corresponding relationship that the sub display panels arranged in the sequential order of D11, D21, D31, D32, D22, D12, D13, D23 and D33 respectively receive the submatrices of the data of the testing image in the sequential order of E11, E12, E13, E23, E22, E21, E31, E32 and E33.

Based on the corresponding relationship, the third topology can be adjusted, so that the first topology can be obtained finally. For example, for the corresponding relationship mentioned above, the plurality of submatrices E of the data of the testing image can be adjusted to be in an order of E11, E21, E31, E32, E22, E12, E13, E23 and E33, which, therefore is kept consistent with the connecting order (i.e., the first topology) of the sub display panels D through the display channel, so that the first topology is determined.

Although the designate location is at the first row and the first column in above description, however, the embodiments of the disclosure are not limited thereto, any expected location can be chosen as the designate location, such as a location at the first row and the second column, a location at the last row and the last column, etc. Furthermore, although FIGS. 4A and 4B are taken as examples in the above description, however, the embodiments of the present disclosure are not limited thereto, one skilled in the art can choose any appropriate testing image for detecting.

Figure 6:
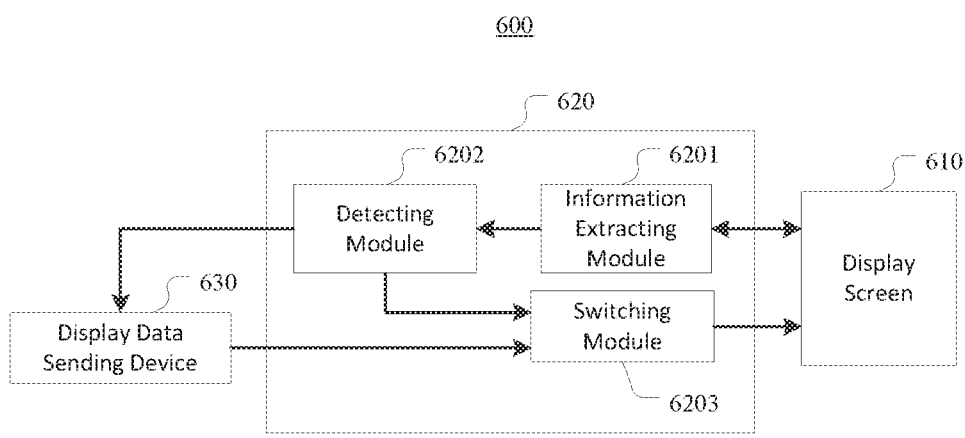
FIG. 6 shows a structural block diagram of a display apparatus according to an embodiment of the present disclosure.

FIG. 6 shows a structural block diagram of a display apparatus according to an embodiment of the present disclosure. The display apparatus 600 shown in FIG. 6 is similar to the display apparatus 200 shown in FIG. 2, the differences in between at least comprises that the display apparatus 600 further comprises a display data sending device 630 besides the display panel 610 and the detecting device 620, wherein the detecting device 620 is structurally different from the detecting device 220 referring to FIG. 2. For clarity of description, only different parts are described in detail as follow, the description of like parts is omitted or simplified herein.

As shown in FIG. 6, the display apparatus 600 comprises the display panel 610, the detecting device 620 and the display data sending device 630. The display panel 610, the same with the display panel 210, is for example, any display panel described above referring to FIG. 3A to 3C. The detecting device 620, similar to the detecting device 220 shown in FIG. 2, is configured to obtain basic information of the display panel 610 through the information channel and determine the first topology according to the basic information and the second topology. The display data sending device 630 is configured to sequence the display data according to the first topology determined by the detecting device 620 and provide the sequenced display data to the display panel 620 through the display channel.

Unlike the detecting device 220 shown in FIG. 2, the detecting device 620 shown in FIG. 6 comprises an information extracting module 6201, a detecting module 6202 and a switching module 6203.

The information extracting module 6201, similar to the information extracting module 2201 shown in FIG. 2, is configured to extract the basic information of the display panel 610 through the information channel, and through the information channel, read the data of the testing image respectively received by each of the plurality of sub display panels D.

The detecting module 6202, similar to the detecting module 2202 shown in FIG. 2, is configured to generate the testing image according to the basic information from the information extracting module 6201, provide the testing image to the plurality of sub display panels D of the display panel 610 through the display channel, and determine the first topology according to the second topology and the data of the testing image, which is respectively received by the plurality of sub display panels D and provided by the information extracting module 6201. In some embodiments, the detecting module 6202 can employ the structure shown in FIG. 5, which comprises an image generating unit 2202-1 and a topology calculating unit 2202-2. The image generating unit 2202-1, connected with the information extracting module 6201, is configured to generate the testing image, such as the testing image shown in FIG. 4A and FIG. 4B, according to the resolution of the display panel 210 and the resolution of each of the plurality of sub display panels D provided by the information extracting module 6201. The topology calculating unit 2202-2, connected with the information extracting module 6201 and the display data sending device 630, is configured to determine the locations of the plurality of sub display panels 610 in the array according to the second topology, and adjust the third topology according to a relationship between the data of the testing image received by the plurality of sub display panels D and the locations of the plurality of sub display panels D in the array to obtain the first topology (for example, by the determination manner described above referring to FIGS. 3A, 4A, and 4B in the embodiment shown in FIG. 2), and provide the obtained first topology to the display data sending device 630.

The switching module 6203 is configured to switchably connect the detecting module 6202 or the display data sending module 630 to the display channel of the display panel 610, specifically, to connect the detecting module 6202 (such as the image generating unit 2202-1 in the detecting module 6202) to the display channel of the display panel 610 at detecting phase and to connect the display data sending device 630 to the display channel of the display panel 610 at displaying phase.

When the first topology is under detection, the information extracting module 6201 can extract the basic information of the display panel 610 through the information channel, the basic information is, for example, the resolution of the display panel 610, the resolution of each of the plurality of sub display panels D, etc. The detecting module 6202 generates the testing image according to the basic information provided by the information extracting module 6201, the testing image carries information corresponding to locations of the pixels in the display panel 610, for example, the testing image can be partitioned into a plurality of sub portions which are arranged in an order according to the predetermined third topology, each portion corresponds to a corresponding sub display panel D. After generating the testing image, the detecting module 6202 can trigger the switching module 6203 to connect the detecting module 6202 to the display channel of the display panel 610, so that the testing image generated by the detecting module 6202 is provided to the plurality of sub display panels D of the display panel 610 through the display channel. The plurality of sub portions are respectively received by the corresponding sub display panels following the same order. Through the information channel, the information extracting module 6201 reads the data of the testing image received by each of the plurality of sub display panels D, and provides the data of the testing image to the detecting module 6202. The detecting module 6202 determines the first topology according to the connecting form (i.e., the second topology) of the information channel and the data of the testing image received by the plurality of sub display panels D, and provides the determined first topology to the display data sending device 630. By this time the detection is completed, the switching module 6203 connects the display data sending device 630 to the display channel of the display panel 610. The display data sending device 630 sequences the display data according to the first topology provided by the detecting module 6202 and provides the sequenced display data to the plurality of sub display panels D of the display panel 610 through the display channel.

The switching module 6203 is triggered to switch according to the generation of the testing image and the determination of the first topology in the embodiment described above, that is, the generation of the testing image is considered as the beginning of the detecting phase, and the determination of the first topology is considered as the beginning of the displaying phase, however, the embodiments of the disclosure are not limited thereto, the detecting phase and the displaying phase described here can be optionally defined as needed. For example, the switching module 6203 can be made to switch to the detecting module 6202 at the time when the display apparatus 600 starts up, and to switch to the display data sending device 630 when the debugging on the entire display apparatus is completed. For instance, in some embodiments, just after the first topology is determined, normal operations to display image or video may not be desired, for example, a debugging on the determined first topology or on other components, or other operation processes may be required, therefore any respected event can be used as a trigger to start the displaying phase, even a specialized manual trigger device may be introduced to let users manually make the switching module 6203 switch to the display data sending device 630 as needed.

Figure 7:
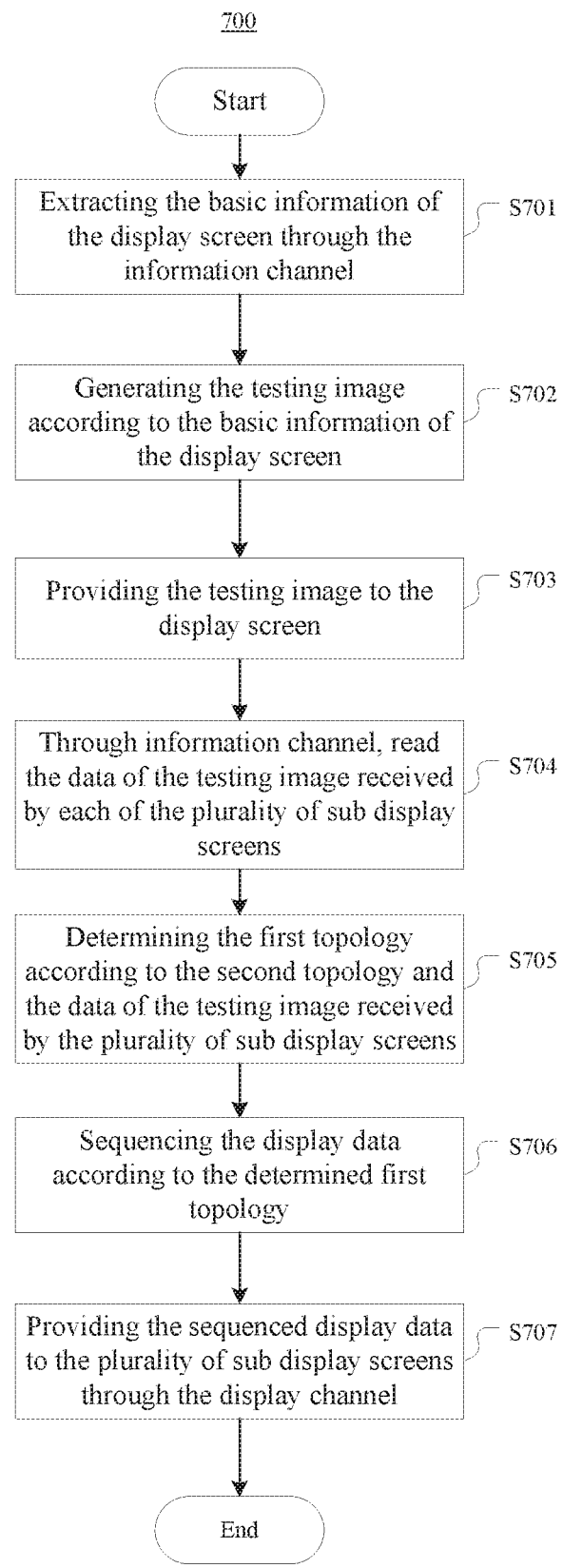
FIG. 7 shows a flow diagram of a display control method according to an embodiment of the present disclosure.

FIG. 7 shows a flow diagram of a display control method 700 according to an embodiment of the present disclosure. The method is suitable for any embodiment of the display panels 210 and 610 described above.

At step S701, the basic information of the display panel is extracted through the information channel, the basic information is, for example, the resolution of the display panel, the resolution of each of the plurality of sub display panels, etc. The information channel can be arranged among the plurality of sub display panels of the display panel according to the second topology. For example, the information channel can be arranged according to the method referring to FIGS. 3A and 3C, and can certainly arranged by any other needed manner. Although the connecting form (the first topology) of the display channel among the plurality of sub display panel is unknown or partially unknown, however, by the information channel additionally connected among the plurality of sub display panels according to the known connecting form (the second topology), information corresponding to the locations of the sub display panels can be obtained during information transferring process, so that the connecting form of the display channel can be figured out.

At step S702, the testing image is generated according to the basic information of the display panel, the testing image is, for example, the testing image described above referring to FIGS. 4A and 4B.

At step S703, the testing image is provided to the display panel, so that the testing image is provided to the plurality of sub display panels of the display panel through the display channel. A plurality of sub portions are respectively received by the corresponding sub display panels following a same order. The topology of the display panel shown in FIG. 3A and the testing image shown in FIG. 4A are taken as examples, the testing image shown in FIG. 4A is provided to the sub display panel D11 after being generated. According to the connecting form (i.e., the first topology) of the display channel shown in FIG. 3A, the sub display panels D receive the corresponding submatrices E of the data of the testing image in a sequential order of D11, D21, D31, D32, D22, D12, D13, D23 and D33; while, according to the sequencing form (i.e., the third topology) referring to FIG. 4A, the corresponding submatrices E are arranged in a sequential order of E11, E12, E13, E23, E22, E21, E31, E32 and E33, which means, the sub display panels arranged in the sequential order of D11, D21, D31, D32, D22, D12, D13, D23 and D33 respectively receive the submatrices of the data of the testing image in the sequential order of E11, E12, E13, E23, E22, E21, E31, E32 and E33.

At step S704, the data of the testing image received by the plurality of sub display panels is read through the information channel. For example, the data element at a designate location (for example, at the first row and the first column) in each submatrix of the testing image is read. For the testing image shown in FIG. 4A, if the data element is {0, 0}, then it is indicated that the corresponding submatrix is E11 which is located at the first row and the first column; if the data element is {2, 1}, then it is indicated that the corresponding submatrix is E32 which is located at the third row and the second column, and so forth. The testing image shown in FIG. 4B is equally suitable, under an example condition when the 3840*2160 matrix mentioned above is partitioned into 9 submatrices forming a 3 by 3 array, if the data element is {0, 0}, then it is indicated that the corresponding submatrix is E11 which is located at the first row and the first column; if the data element is {0, 1280}, then it is indicated that the corresponding submatrix is E12 which is located at the first row and the second column, and so forth. Although the designate location is at the first row and the first column in above description, however, the embodiments of the disclosure are not limited thereto, any expected location can be chosen as the designate location, such as a location at the first row and the second column, a location at the last row and the last column, etc. Furthermore, although the embodiments shown in FIGS. 4A and 4B are taken as examples in the above description, however, the embodiments of the disclosure are not limited thereto, one skilled in the art can choose any appropriate testing image for detecting.

At step S705, the first topology is determined according to the connecting form (i.e., the second topology) of the information channel and the data of the testing image received by the plurality of sub display panels.

As mentioned above, on one hand, the connecting form and the information transferring manner of the information channel are already known, so that when a submatrix of the data of the testing image received by one of the plurality of sub display panels is read through the information channel, it can be known which one of the plurality of sub display panels is corresponding to that submatrix. That is, when a submatrix received by one sub display panel is read from the one sub display panel through the information channel, the location of the one sub display panel in the entire display panel can be known according to the second topology which is already known. On the other hand, the data elements in each submatrix E can represent the location of the corresponding sub portion in the entire testing image, according to this, when one submatrix received by one sub display panel is read from the one sub display panel through the information channel, the location of the corresponding sub portion in the entire testing image can be known. By synthesizing the two aspects mentioned above, a corresponding relationship between each sub display panel and the sub portion of the testing image received by the sub display panel is obtained. For instance, for the embodiments described above referring to FIGS. 3A and 4A, the corresponding relationship that the sub display panels arranged in the sequential order of D11, D21, D31, D32, D22, D12, D13, D23 and D33 respectively receive the submatrices of the data of the testing image in the sequential order of E11, E12, E13, E23, E22, E21, E31, E32 and E33 can be obtained.

Based on the corresponding relationship, the third topology can be adjusted, so that the first topology can be obtained finally. As an example, the third topology can be adjusted by the following method: if the location of one submatrix received by one of the plurality of sub display panels is not the same with the location of the one of the plurality of sub display panels in the array, then the one submatrix in the third topology will be replaced with a submatrix corresponding to the location of the one of the plurality of sub display panels in the array. For example, for the corresponding relationship mentioned above, the plurality of submatrices E of the data of the testing image can be adjusted to be in an order of E11, E21, E31, E32, E22, E12, E13, E23 and E33, which, therefore, is kept consistent with the connecting order (i.e., the first topology) of the sub display panels through the display channel, so that the first topology is determined. So far, the detection on the first topology is completed, other processes, operations and/or calculations can be performed based on the first topology. For example, the following steps S706 and S707 can be performed to complete the debugging on the display apparatus.

At step S706, the display data is sequenced according to the first topology determined by the step S705. For example, the display data can be partitioned by a same dividing method with that of the testing image, and the partitioned display data can be sequenced according to the first topology determined by the step S705. For instance, for the examples described above by referring to FIGS. 3A and 4A, the display data can be partitioned according to the dividing method referring to FIG. 4A, and then the partitioned display data can be sequenced according to an order of E11, E21, E31, E32, E22, E12, E13, E23 and E33. This makes the dividing and the sequencing methods of the display data of the display panel consistent with the resolution of each of the plurality of sub display panels and the connecting form of the display channel, so that the entire display panel can display correctly.

At step S707, the sequenced display data is provided to the plurality of sub display panels of the display panel through the display channel.

Although the steps in the above embodiments are described in a specific order, however, the embodiments of the disclosure are not limited thereto, changes can be made by one skilled in the art accordingly. For example, other operations can be performed between the steps S705 and S707, such as correcting the first topology obtained by the step S705, debugging other components, waiting for instructions from users, and so on. Moreover, after the first topology is obtained at the step S705, any desired operation can be performed according to the first topology, which is not limited to the steps S706 and S707. For example, based on the first topology, the connecting form among the plurality of sub display panels can be analyzed and optimized, configuration information of the plurality of sub display panels can be adjusted, and/or other information can be combined with the first topology for calculation, processing and adjustment and so on. As an example, the first topology can be optimized and adjusted between the step S705 and the step S706, so that result of the detection on the first topology can be more accurate. As an example, debugging, processing and/or other operations can be performed on other components between the step S705 and the step S707, even a specific display instruction can be waited for before the step S707.

According to the embodiments of the present disclosure, the connection topology of the display channel among the plurality of sub display panels can be figured out by providing an information channel, which is connected among the plurality of sub display panels according to a known connecting form and transfers information among the plurality of sub display panels, so that the connection topology can be automatically detected.

According to the embodiments of the disclosure, by automatically detecting the connection topology and arranging the display data accordingly, an accurate and automatic debugging process with high speed can be implemented, which greatly saves debugging time compared with manual debugging method in conventional way.

According to the embodiments of the disclosure, the type and the connecting form of the information channel, and the format and the content of the testing image can be chosen freely as needed, so that it is convenient for users to detect the topologies and debug the system by a more flexible and efficient way.

The foregoing descriptions of specific embodiments of the present disclosure have been presented, but are not intended to limit the disclosure to the precise forms disclosed. It will be readily apparent to one skilled in the art that many modifications and changes may be made in the present disclosure. Any modifications, equivalence, variations of the preferred embodiments can be made without departing from the doctrine and spirit of the present disclosure.

The invention claimed is:

1. A display apparatus, comprising:
   a display panel containing a plurality of sub display panels arranged in an array, wherein the plurality of sub display panels are connected by a display channel to form a first topology indicating a first connecting sequence of the plurality of sub display panels, wherein the plurality of sub display panels are also connected by an information channel according to a predetermined second topology indicating a second connecting sequence of the plurality of sub display panels; and
   a detecting device coupled to the display panel and configured to obtain basic information provided by the plurality of sub display panels via the second connecting sequence of the sub display panels, the detecting device operable to determine the first topology via reading data elements generated by at least one of the plurality of sub display panels according to the basic information and the second topology.

2. The display apparatus according to claim 1, wherein the detecting device comprises an information extracting module and a detecting module,
   the information extracting module is configured to obtain the basic information of the display panel, and to read, through the information channel, data of a testing image received by each of the plurality of sub display panels, wherein said basic information including resolution of the display panel and resolution of each of the plurality of sub display panels;
   the detecting module is configured to generate the testing image according to the basic information of the display panel, provide the testing image to the plurality of sub display panels of the display panel through the display channel, and determine the first topology according to the second topology and the data of the testing image received by each of the plurality of sub display panels and provided by the information extracting module, the testing image carries information corresponding to locations of the plurality of sub display panels in the display panel.

3. The display apparatus according to claim 2, wherein the resolution of the display panel is artificially set and the resolution of each of the plurality of sub display panels is extracted from a respective one of the plurality of sub display panels through the information channel.

4. The display apparatus according to claim 2, further comprising: a display data sending device configured to sequence a display data according to the first topology determined by the detecting device and provide the sequenced display data to the display panel through the display channel;
wherein the detecting device further comprises: a switching module configured to connect the detecting module to the display channel of the display panel at detecting phase, and connect the display data sending device to the display channel of the display panel at displaying phase.

5. The display apparatus according to claim 2, wherein the detecting module comprises:
an image generating unit configured to generate the testing image according to the resolution of the display panel, and divide the testing image into a plurality of sub portions according to the resolution of each of the plurality of sub display panels, each of the plurality of sub portions corresponds to a respective one of the plurality of the sub display panels, the plurality of sub portions are sequenced according to a predetermined third topology;
a topology calculating unit configured to determine a location of each of the plurality of sub display panels in the array according to the second topology, and adjust the third topology according to a relationship between locations of the sub portions received by the plurality of sub display panels in the testing image and the locations of the plurality of sub display panels in the array to obtain the first topology.

6. The display apparatus according to claim 5, wherein the testing image comprises data elements arranged in a matrix having a size corresponding to the resolution of the display panel, the matrix is partitioned into a plurality of submatrices corresponding to the plurality of sub display panels respectively and having a sending order determined according to the third topology, the data elements in each of the plurality of submatrices represent the location of the submatrix in the matrix.

7. The display apparatus according to claim 5, wherein the testing image comprises data elements arranged in a matrix having a size corresponding to the resolution of the display panel, each of the data elements in the matrix represents a location of a pixel in the display panel, the matrix is partitioned into a plurality of submatrices corresponding to the plurality of sub display panels respectively and having a sending order determined according to the third topology.

8. The display apparatus according to claim 1, wherein the information channel comprises a one-way information sending path and a one-way information returning path.

9. The display apparatus according to claim 1, wherein the information channel is a two-way channel.

10. The display panel according to claim 1, wherein the information channel is a serial channel or a parallel channel.

11. A display control method, comprising:
obtaining basic information of a display panel generated by at least one of a plurality of sub display panels arranged in an array via an information channel which connects the plurality of sub display panels in a predetermined second topology indicating a second connecting sequence of the plurality of sub display panels, wherein obtaining basic information includes generating reading data elements by one or more sub display planes during transferring display data to the plurality of sub display panels for displaying images through a display channel which forms a first topology indicating a first connecting sequence of the plurality of sub display panels; and
determining the first topology via reading data elements generated by at least one of the plurality of sub display panels according to the basic information and the second topology.

12. The display control method according to claim 11, wherein the basic information includes resolution of the display panel and resolution of each of the plurality of sub display panels, and step of determining the first topology according to the basic information and the second topology comprises:
generating a testing image according to the basic information and providing the testing image to the plurality of sub display panels of the display panel through the display channel, wherein the testing image carries information corresponding to locations of the plurality of sub display panels in the display panel;
through the information channel, reading data of the testing image received by the plurality of sub display panels;
determining the first topology according to the second topology and the data of the testing image received by the plurality of sub display panels.

13. The display control method according to claim 12, wherein the resolution of the display panel is artificially set and the resolution of each of the plurality of sub display panels is extracted through the information channel.

14. The display control method according to claim 12, further comprising: after the first topology is determined, sequencing display data according to the determined first topology and providing the sequenced display data to the display panel through the display channel.

15. The display control method according to claim 12, wherein
step of generating the testing image according to the basic information comprises: generating the testing image according to the resolution of the display panel and dividing the testing image into a plurality of sub portions according to the resolution of each of the plurality of sub display panels, wherein each of the plurality of sub portions corresponds to a respective one of the sub display panels and the plurality of sub portions are sequenced according to a predetermined third topology;
step of determining the first topology according to the second topology and the data of the testing image received by the plurality of sub display panels comprises: determining a location of each of the plurality of sub display panels in the array according to the second topology, and adjusting the third topology according to a relationship between locations of the plurality of sub portions received by the plurality of sub display panels in the testing image and the locations of the plurality of sub display panels in the array to obtain the first topology.

16. The display control method according to claim 15, wherein the testing image comprises data elements arranged in a matrix having a size corresponding to the resolution of the display panel, the matrix is partitioned into a plurality of submatrices corresponding to the resolution of each of the plurality of sub display panels and having a sending order determined according to the third topology, each of the plurality of submatrices corresponds to a respective one of the plurality of sub display panels, the data elements in each of the plurality of submatrices represent the location of the submatrix in the matrix.

17. The display control method according to claim 15, wherein the testing image comprises data elements arranged in a matrix having a size corresponding to the resolution of the display panel, each of the data elements in the matrix represents a location of the data element in the matrix, the matrix is partitioned into a plurality of submatrices corresponding to the resolution of each of the plurality of sub display panels and having a sending order determined according to the third topology, each of the plurality of submatrices corresponds to a respective one of the plurality of sub display panels.

18. The display control method according to claim 16, wherein step of through the information channel, reading the data of the testing image received by the plurality of sub display panels comprises: through the information channel, reading one of the data elements at a designate location in the submatrix received by each of the plurality of sub display panels.

19. The display control method according to claim 18, wherein step of adjusting the third topology according to the relationship between the locations of the plurality of sub portions received by the plurality of sub display panels in the testing image and the locations of the plurality of sub display panels in the array comprises:
for each of the plurality of sub display panels, determining the location of the submatrix received by the sub display panel in the matrix according to the data element at the designate location in the submatrix received by the sub display panel, and if the location of the submatrix received by the sub display panel is not the same with the location of the sub display panel in the array, then in the third topology, replacing the submatrix received by the sub display panel with the submatrix corresponding to the location of the sub display panel in the array.

20. A display control method, comprising:
obtaining basic information of a display panel which comprises a plurality of sub display panels arranged in an array, wherein the plurality of sub display panels is connected by a display channel to form a first topology and an information channel connects the plurality of sub display panels according to a predetermined second topology; and
determining the first topology according to the basic information and the second topology, wherein the basic information includes resolution of the display panel and resolution of each of the plurality of sub display panels, wherein the determining the first topology includes generating a testing image according to the basic information and providing the testing image to the plurality of sub display panels of the display panel through the display channel, wherein the testing image carries information corresponding to locations of the plurality of sub display panels in the display panel, reading data of the testing image received by the plurality of sub display panels, and determining the first topology according to the second topology and the data of the testing image received by the plurality of sub display panels; wherein generating the testing image includes generating the testing image according to the resolution of the display panel and dividing the testing image into a plurality of sub portions according to the resolution of each of the plurality of sub display panels, wherein each of the plurality of sub portions corresponds to a respective one of the sub display panels and the plurality of sub portions are sequenced according to a predetermined third topology; wherein determining the first topology includes determining a location of each of the plurality of sub display panels in the array according to the second topology, and adjusting the third topology according to a relationship between locations of the plurality of sub portions received by the plurality of sub display panels in the testing image and the locations of the plurality of sub display panels in the array to obtain the first topology; wherein the testing image includes data elements arranged in a matrix having a size corresponding to the resolution of the display panel, the matrix is partitioned into a plurality of submatrices corresponding to the resolution of each of the plurality of sub display panels and having a sending order determined according to the third topology, each of the plurality of submatrices corresponds to a respective one of the plurality of sub display panels, the data elements in each of the plurality of submatrices represent the location of the submatrix in the matrix, wherein reading the data of the testing image includes through the information channel, reading one of the data elements at a designate location in the submatrix received by each of the plurality of sub display panels.

* * * * *